United States Patent [19]

St-Amant et al.

[11] 3,984,759

[45] Oct. 5, 1976

[54] APPARATUS FOR USE IN AN INDUCED POLARIZATION SYSTEM FOR MEASURING THE DEFORMATION OF A PERIODIC SIGNAL CONCEALED IN NOISE

[75] Inventors: Marcel St-Amant, Montreal; Edwin Gaucher, Ste-Foy, both of Canada

[73] Assignee: Soquem, Ste-Foy, Canada

[22] Filed: Mar. 21, 1975

[21] Appl. No.: 560,955

[52] U.S. Cl. .................................. 324/6; 324/9; 325/28; 340/347 AD
[51] Int. Cl.² ........................................ G01V 3/06
[58] Field of Search ................ 324/1, 6, 7, 9, 83 D, 324/83 A; 325/28, 42, 52, 323, 363, 473; 340/347 AD, 347 SH

[56] References Cited
UNITED STATES PATENTS

| | | | |
|---|---|---|---|
| 3,525,037 | 8/1970 | Madden et al. | 324/6 X |
| 3,679,978 | 7/1972 | Hopkins | 324/9 X |
| 3,701,940 | 10/1972 | Nilsson | 324/9 X |
| 3,849,722 | 11/1974 | Nilsson | 324/9 |

Primary Examiner—Gerard R. Strecker

[57] ABSTRACT

An apparatus for measuring the deformation parameters of a periodic signal concealed in noise. The signal is transmitted by a transmitter controlled by a stable clock and received by a receiver also controlled by a stable clock of the same frequency as the one of the transmitter. The receiver comprises a detector for detecting the signal transmitted by the transmitter, means for resetting to a predetermined value the voltage detected by the detector at each integral number of cycles but at any particular time in the cycle, and an analog to digital converter connected to the detector for sampling the signal detected by the detector a predetermined number of times per cycle for converting the analog signal into a digital signal. A digit accumulator is connected to the output of the converter for accumulating the digital signals detected at corresponding sampling times in each cycle and a calculator is connected to the accumulator for determining the phase of the digital signal detected as compared to the signal transmitted by the transmitter and for evaluating therefrom the deformation parameters of the received signal.

13 Claims, 17 Drawing Figures

3,984,759

APPARATUS FOR USE IN AN INDUCED POLARIZATION SYSTEM FOR MEASURING THE DEFORMATION OF A PERIODIC SIGNAL CONCEALED IN NOISE

This invention relates to an apparatus for measuring the deformation parameters of a periodic signal which has been passed through a medium and is concealed in a large amount of noise picked up in such medium, and more particularly to the use of such an apparatus in induced polarization systems for determining the properties of the soil from the deformation parameters of such periodic signal.

One type of induced polarization system which is commonly used is the time domain induced polarization system which consists in passing a direct current through the ground which builts up charges on the interfaces between metallic minerals and electrolytes. The current is cut off and redistribution of these charges is measured as a voltage decay referred to as induced polarization effect at the ground surface. Comparison of this secondary voltage with the primary voltage measured when the current is on provides a measure of chargeability of the surface. Such known induced polarization system comprises a transmitter and a receiver. The transmitter produces a rectangular current pulse in the ground. The transmitter normally transmits a positive voltage for $T_1$ seconds and is off for $T_2$ seconds. It then transmits a negative voltage for $T_1$ seconds and is off for $T_2$ seconds. This completes the full cycle of the transmitter. The operation of the transmitter is controlled by a clock. The receiver operates remotely and the operation thereof is also controlled by a clock which is of the same frequency as the one of the transmitter.

Depending on the geometrical disposition of the electrodes and for certain types of soils, the signal received by the receiver is normally concealed in a large amount of noise. In order to distinguish the useful signal from the noise, it is commonly known to repeat the signal transmitted by the transmitter a predetermined number of times and to take the average of the parameters measured by the receiver. Since it is necessary to know the time at which the transmitter ceases to transmit in time domain induced polarization so as to be able to measure the known parameters Vp representing the primary signal or the chargeability Ma, it becomes necessary to know exactly the phase difference between the beginning of the operation of the transmitter and of the receiver or, more precisely, the phase shift between the two clocks regulating the operation of the transmitter and receiver.

Up until now it has been the common practice to synchronize the receiver with the transmitter as disclosed in Canadian patent No. 903,093, issued June 22, 1972. All the known synchronization methods require the immediate knowledge or the knowledge within a short time interval of the state of the cycle of the transmitter at each cycle or the past knowlege of the state of a transmitter which is very stable.

It is the object of the present invention to provide a receiver which does not require any means of synchronization thereof with the transmitter. Such receiver permits to store and analyze the information contained in the signal at the end of each cycle and, as the number of cycles stored increases, to determine more exactly the form of the useful signal concealed in the noise so as to permit evaluation of the parameters of the received signals.

The apparatus, in accordance with the invention, comprises a transmitter controlled by a stable clock for transmitting a periodic signal which is received by a receiver also controlled by a stable clock of the same frequency. The receiver comprises a detector for detecting the signal transmitter, means for resetting to a predetermined value the voltage detected by said detector at each integral number of cycles but at any particular time in the cycle, and an analog to digital converter connected to the detector for sampling the signal detected by the detector a predetermined number of times per cycle. Means are provided for accumulating the digital signal detected at corresponding sampling times in each cycle and a digital calculator is connected to the above-mentioned accumulating means for determining the phase of the digital signal detected as compared to the signal transmitted by the transmitter. The digital calculator then evaluates the deformation parameters of the received signal and, when used in an induced polarization system, determines the properties of the soil from such deformation parameters.

The detector includes a filter for filtering the components of the detected signal which are outside the useful frequency band of the signal. Such detector includes a first twin T filter circuit for filtering the 60 Hz component of the detected signal, a second filter circuit for filtering the D.C. component of the detected signal and a third low-pass filter circuit for filtering the high frequency component of the detected signal.

The detector further comprises an attenuator connected in series with the filter and the apparatus further comprises an amplifier connected in series with the attenuator, a peak detector connected to the output of the amplifier for detecting saturation of the amplifier, and a programmer responsive to the peak detector for controlling the attenuator to reduce the amplitude of the detected signal until saturation is obviated.

The means for resetting the voltage detected by the detector to a predetermined value may be an integrator connected to the output of the amplifier and having its output connected to the input of the amplifier through an adder. The integrator is controlled by the programmer for resetting the output of the amplifier to such predetermined value at every cycle interval.

The accumulating means includes a bit accumulator and a memory connected to the bit accumulator for storing the digital signal accumulated at the end of each sampling time and for circulating the accumulated signal corresponding to the next sampling time back to the bit accumulator for adding thereto the digital signal being sampled.

The invention will now be disclosed, by way of example, with reference to a preferred embodiment thereof and to the accompanying drawings in which.

Figure 2:
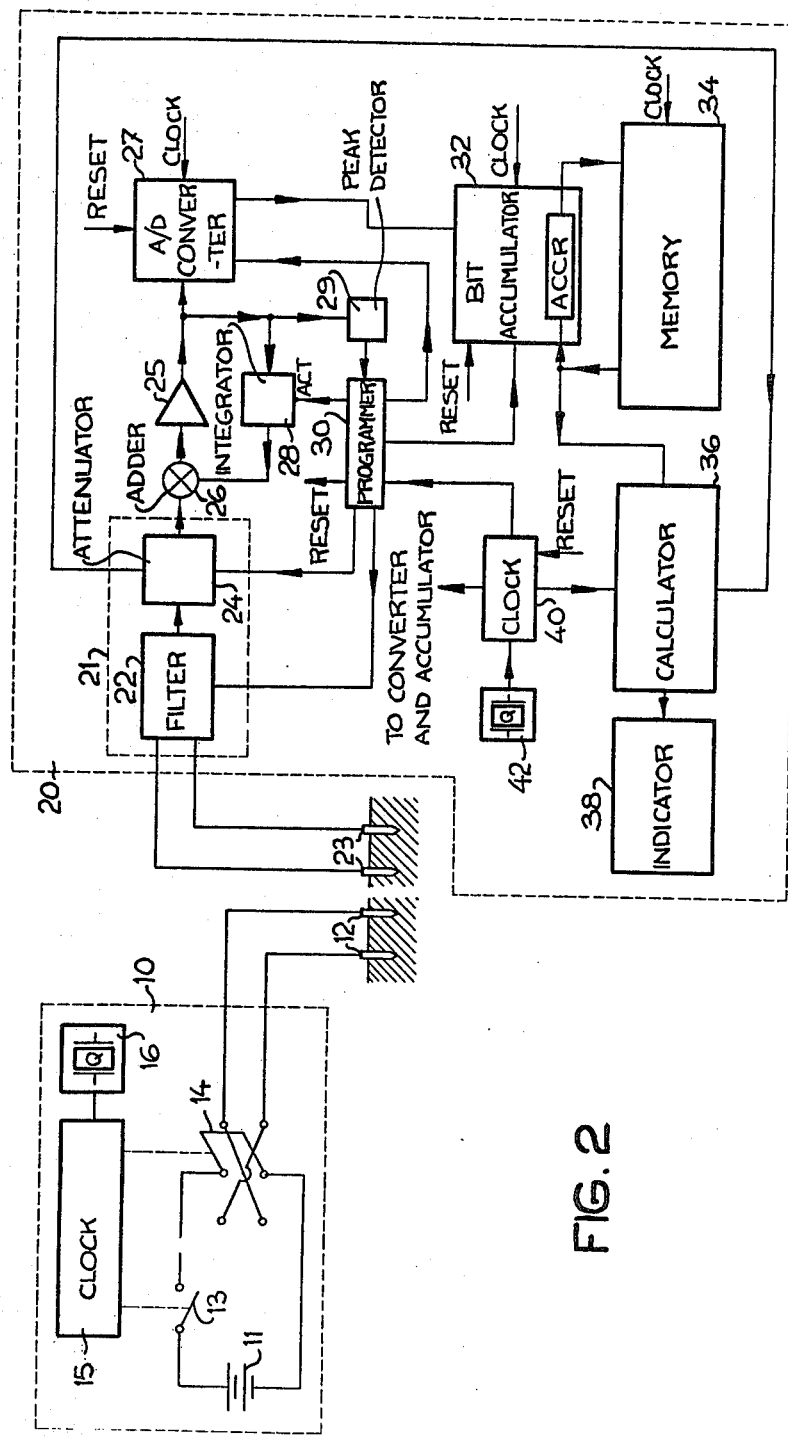
FIG. 2 illustrates a block diagram of the system in accordance with the invention as applied to an induced polarization system.
Figure 7A:
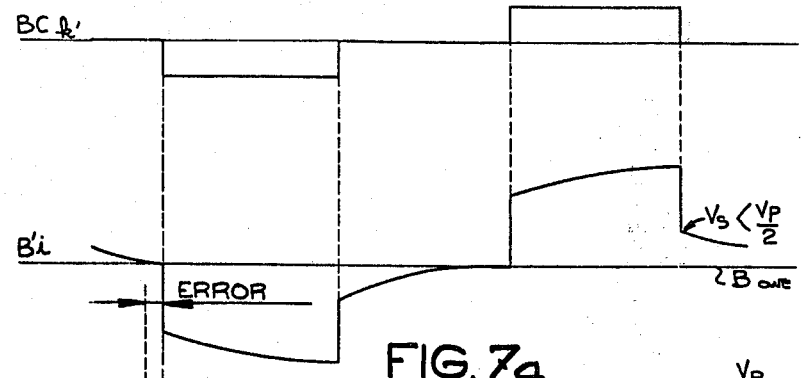
Figure 7B:
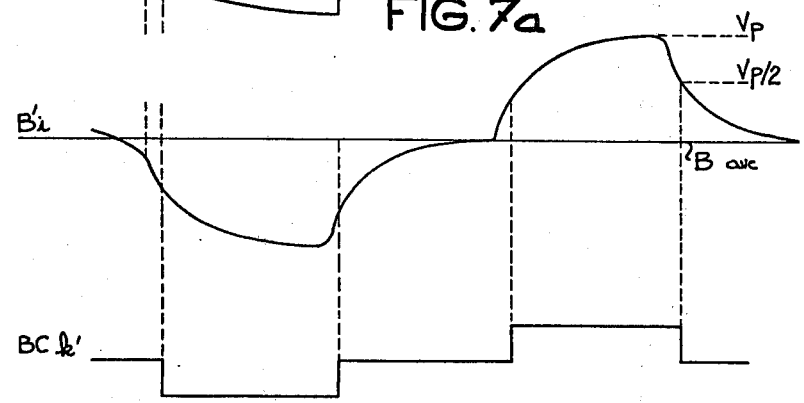
Figure 8:
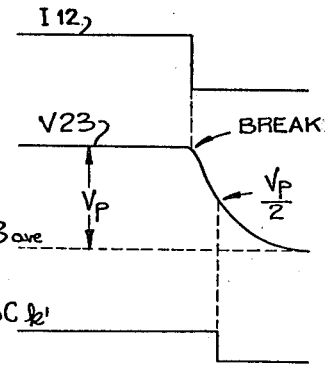
Figure 9:
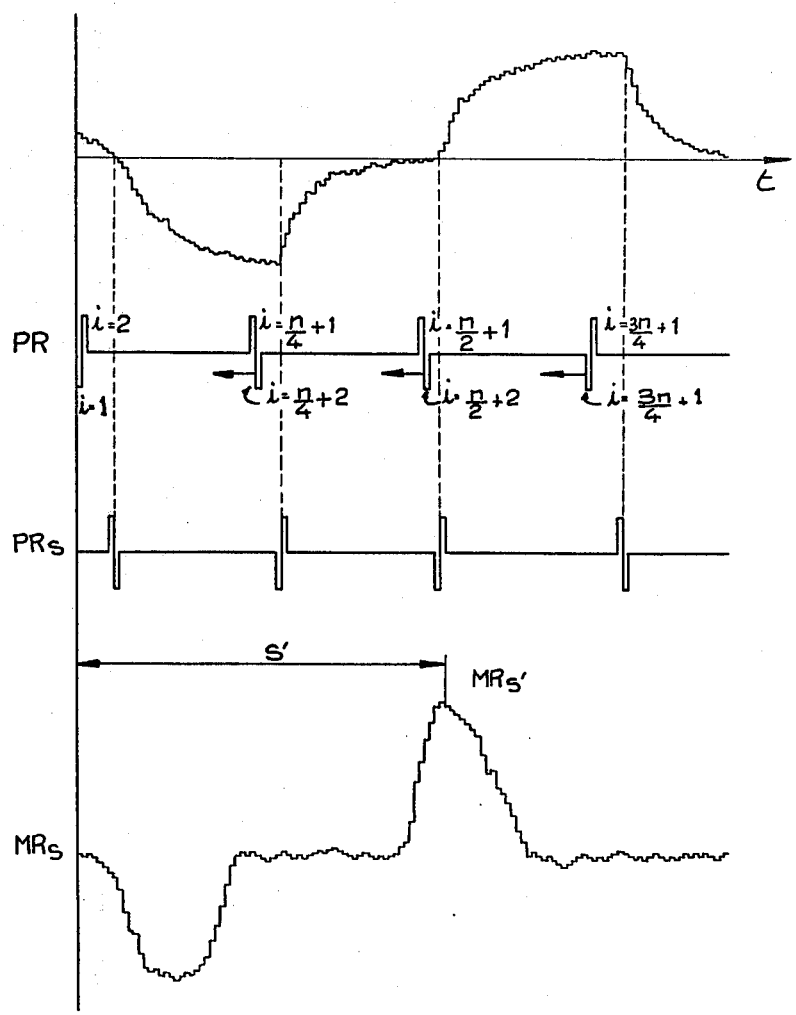

FIGS. 7a and 7b illustrate the error introduced into the measurements of the calculator of FIG. 2 due to the shape of the signal received because of predetermined soil conditions; and FIGS. 8 and 9 illustrate a particular method of overcoming the problem encountered in FIGS. 7a and 7b.

Figure 1A:
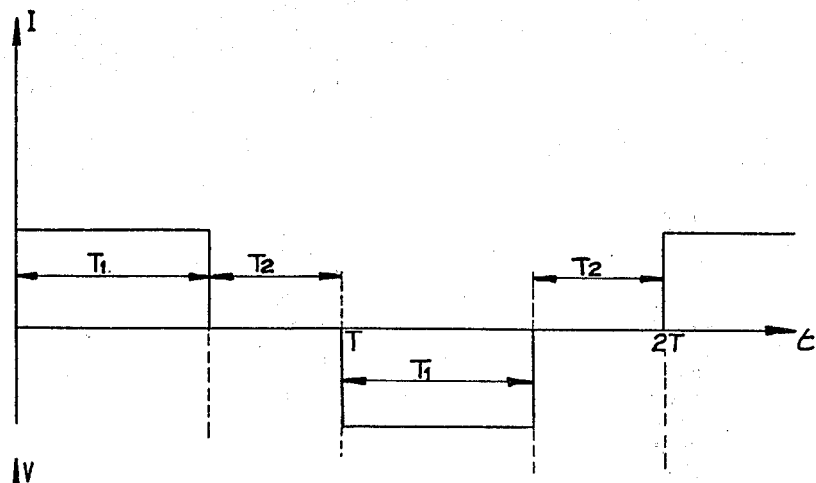
FIGS. 1a, 1b and 1c illustrate respectively the current transmitted by the transmitter, the ideal voltage expected to be detected by the receiver, and the actual voltage detected due to the presence of noise.
Figure 1B:
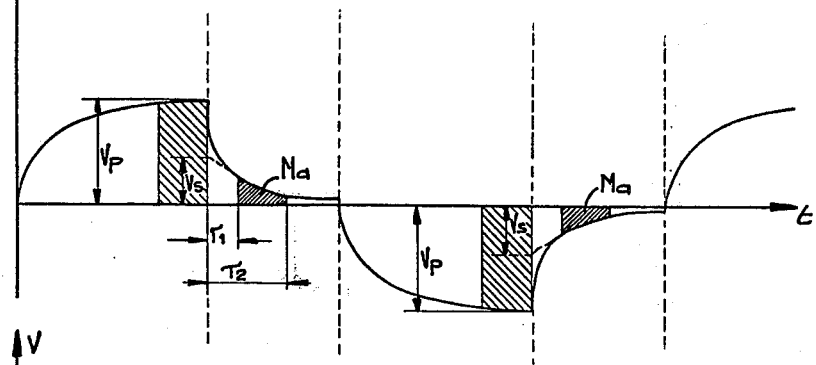
Figure 1C:
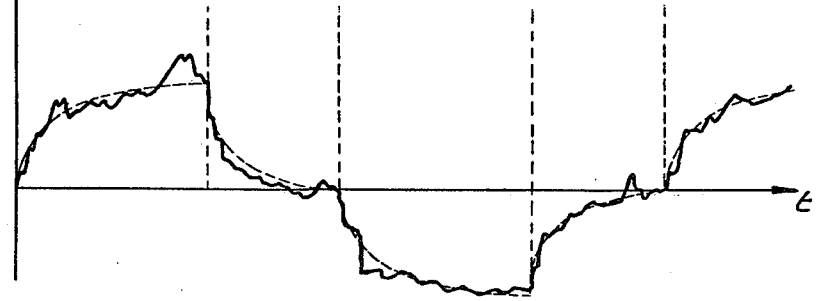

In order to provide an idea of the signals involved in the embodiment of the invention hereinafter disclosed in detail, there has been illustrated in FIG. 1a the periodic signal of the transmitter, in FIG. 1b the ideal signal which should be detected by the receiver, and in FIG. 1c the signal which in fact is detected due to the presence of noise. As shown in FIG. 1a, the transmitter transmits positively for a predetermined period of time T1 and is off for a period of time T2. Then the transmitter transmits negatively for a period of time T1 and is off for a period of time T2. Also shown in FIG. 1b are the parameters Vp representing the primary voltage, Vs representing the secondary voltage and Ma representing the chargeability of the soil. The above parameters are well known in the art and need not be discussed any further.

FIG. 2 illustrates the system in accordance with the invention including a transmitter 10 and a receiver 20 used in an induced polarization system. The transmitter 10 includes a battery 11 adapted to feed a square wave signal of the shape illustrated in FIG. 1a to electrodes 12 inserted in the ground. As commonly known, such a signal may be easily generated from a battery using a contact 13 to cut the current at every half cycle for $T_2$ second, and an inverter 14 for changing the polarity of the signal at every half cycle for $(T_1+T_2)$ second. The operation of the contact 13 and inverter 14 is controlled by a clock 15 stabilized by a quartz oscillator 16. Clock 15 may include relays for operating contact 13 and inverter 14 in known manner.

The receiver 20 comprises a detector circuit 21 including a filter 22 for filtering the signal detected by electrodes 23 inserted in the ground and an attenuator 24 for attenuating the signal. The output of the attenuator is fed to an amplifier 25 through an adder 26. The output of amplifier 25 is fed to an analog-digital converter 27 for converting the analog signal detected into a digital signal. The output of the amplifier is also fed to an integrator 28 the output of which is applied to adder 26 for resetting the output of amplifier 25 to zero at every cycle interval. The output of amplifier 25 is also applied to a peak detector 29 connected to a programmer 30 which controls the operation of the filter, of the attenuator and of other elements of the receiver as it will be disclosed later.

The circuit of FIG. 2 further comprises a digit accumulator 32 including a register ACCR for accumulating the digits generated by the analog-digital converter 27 at each sample and a memory 34 for storing the digital signals accumulated in the register ACCR at the end of sample. The output of the memory 34 is applied to a calculator 36 for performing the required operations on the signal and the results of such operations are illustrated in indicator 38.

The operation of the converter 27, the programmer 30, the bit accumulator 32, the memory 34, and the calculator 36 is controlled by a clock 40 under the supervision of a crystal oscillator 42 in known manner.

Figure 3:
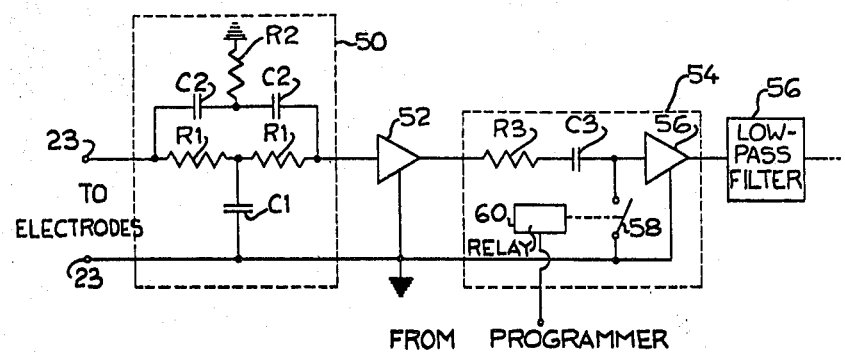
FIG. 3 illustrates a filter used in the system of FIG. 2.

The circuit which has been briefly described above will now be disclosed in more detail by reference to the operation thereof. Before proceeding with the operation of the apparatus, the filter 22 which is illustrated in detail in FIG. 3 will be disclosed. Such filter includes a twin-T circuit 50 for filtering the 60 Hz noise component of the detected signal due to commercial power lines operating at such frequency. The first T includes two resistors $R_1$ connected in series and a capacitor $C_1$ connected between the junction of the two resistors and ground. The second T includes capacitors $C_2$ connected in series across resistors $R_1$ and a resistor $R_2$ having one terminal connected to the junction of capacitors $C_2$ and the other terminal connected to ground. The value of resistor $R_2$ is about half the value of resistors $R_1$ and the value of capacitor $C_1$ is about twice the value of capacitors $C_2$.

The output of the twin-T filter is fed to an amplifier 52 of the "follower" type having a gain equal to unity, a very high input impedance and a very low leakage current. The output of amplifier 52 is fed to a high-pass filter 54 including a capacitor $C_3$ connected in series with a resistor $R_3$ and an amplifier 56 of the same type as amplifier 52. A contact 58 operated by a relay 60 is connected across the input of amplifier 56.

Filter 54 operates as follows:

When contact 58 is closed the capacitor $C_3$ is quickly changed to the voltage detected by the electrodes 23. When contact 58 is opened, the voltage applied to amplifier 56 is zero if the voltage detected by electrodes 23 is constant. However, when the voltage across the electrodes 23 increases or decreases by the value $\Delta V$, the input of the amplifier 56 increases or decreases by the same amount. This circuit is thus a form of high-pass filter which filters the D.C. component of the signal detected by electrodes 23. Such circuit does not substantially distort a signal having a periodic cycle lower than a few seconds. It will also be noted that the use of an amplifier having a leakage current I smaller or equal $10^{-11}$ amp renders such circuit very stable. Indeed, if $C_3$ has a value of say $33\mu F$, $$\frac{dV}{dt} = \frac{I}{C} = \frac{10^{11}}{33 \times 10^{-6}} = 0.3 \times 10^{-6}$$

volt per second. Commercial amplifiers having a leakage current smaller than $10^{-12}$ amp are available.

A low-pass filter 56 is connected to the output of filter 54 to absorb all components of the detected signal having a freqency higher than a predetermined value which, in the present case is about 10 Hz. Such components of the signal add very little useful information to the parameters to be detected with induced polarization systems because the signal detected is of very low frequency ($2T = 8$ seconds).

Returning now to the operation of the circuit of FIG. 2, the output of the filter 22 is applied to amplifier 25 through attenuator 24 which is first set to a minimum of attenuation. Amplifier 25 will probably be saturabed by the signal applied thereto and such will be detected by peak detector 29 connected to the output of the amplifier 25 and which provides a signal to programmer 30 when the output of amplifier 25 exceeds a predetermined maximum value Vm. In response to such a signal, programmer 30 will feed signal to attenuator 24 to increase the attenuation thereof by a predetermined factor. If saturation still occurs in amplifier 25 after attenuator 24 has attenuated the signal, such saturation will again be detected by peak detector 29 and programmer 30 will cause the attenuator 24 to increase its attenuation by another factor until there is no more saturation of amplifier 25. This may take between 2T and 6T seconds at the most, that is between 1 and 3 cycles.

Amplifier 25 and peak detector 29 may be of any type known in the art. Similarly, programmer 30 which, as mentioned previously controls the operation of most of the components of the circuit may be of any conventional type and include a number of monostable, bistable and gate circuits capable of providing a series of control signals at predetermined intervals and in response to predetermined triggering signals. Finally, attenuator 24 may also be of the conventional type and preferably of the digital type. An example of such an attenuator has been disclosed by M. F. Farley in the article intitled "Digital Approach Provide Precise Programmable AGC" and published in Electronics, Vol. 44, Aug. 30, 1971 pages 52 to 56.

When programmer 30 does not receive any more signals from peak detector 29, it feeds a signal ACT to integrator 28 at every cycle (2T seconds) of the signal transmitted by the transmitter 10 and received by the receiver 20. The output $V_{out}$ of integrator 28 is of the form $$V_{out_{28}} = \frac{-1}{RC} \int_{ta}^{t} V_{IN_{28}}(t)$$

wherein ta is the time at which the signal ACT of the programmer occurs, RC the time constant of the integrator, and $V_{IN}$ the input of the integrator.

Assuming that $V_{IN} = AM \times A_0$, where AM is the amplification factor of the amplifier 25 and $A_0$ the input signal of the adder connected to the attenuator, and that $A_0$ is nearly constant at time $t_a$, then $$V_{out_{25}} = AM \times A_0 \, \epsilon^{\frac{-(t-ta)AM}{RC}}$$

By setting the time constant RC of the integrator to a small value, the integrator may be designed to render the output $V_{out_{28}}$ equal to the output of the attenuator in a very short period of time (small fraction of the cycle). The output of the integrator 28 is applied to adder 26 so as to cancel the input $A_0$ and render the input of the amplifier equal to 0 at the end of every cycle (2T seconds). At such time the signal ACT will be cut off and the output of the amplifier will therefore take the form $$V_{out_{25}} = AM [V_{IN}(t) - V_{IN}(t_0)],$$

wherein $t > t_0$ and $t_0$ the time at which the signal ACT has been cut off.

It will be understood that the signal appearing at the output of amplifier 25 is reset to zero at regular intervals equal to a full cycle 2T of the transmitter but that the particular time of the cycle at which the amplifier 25 is reset is not specified and may be anywhere within the cycle. Such time may therefore correspond to the maximum value of the signal illustrated in FIG. 1c and, consequently, the peak detector 29 connected to the output of amplifier 25 will detect, within the next cycle, a variation of voltage varying from $+V_M$ to $-V_M$, that is $2V_M$ in absolute value. Therefore, the peak detector 29 may feed additional signals to the controller 30 so as to cause the controller to increase the attenuation factor of attenuator 24 by an additional factor 2 at the maximum. This should take between 2T and 4T seconds and thus after a total time interval of varying from 4T and 10T, there should be no more saturation of amplifier 25. Consequently at the end of such fixed interval, the programmer 30 will not operate the attenuator 24 from thereon even if small transcients sometimes saturate the amplifier for short periods of time.

The programmer 30 also generates at the very beginning of the operation of receiver a RESET signal to reset to zero the converter 27, the bit accumulator 32 and the clock 40. In addition, programmer 30 generates a signal to energize relay 60 which closes contact 58 to charge capacitor C3 of the filter 54 of FIG. 3 up to a voltage equal to the D.C. component of the detected signal. After a short time interval, the programmer cuts off the RESET and ACT signals and releases relay 60 to open contact 58. The following operation of the programmer 30 is to actuate attenuator 24 as mentioned previously. Once the attenuation factor has been set, the value thereof is fed to the calculator 36 for further use as it will be disclosed later.

The converter 27 samples the output of amplifier 25 $n$ times during each cycle of the analog signal and the amplitude of the samples is coded into a digital form using U bits (word) per sample. In order to faithfully reproduce the analog signal which includes the useful signal and the noise, the number U of binary digits used in the quantization process must be at least equal to 12 for each sample.

The information in digital form is fed to the bit accumulator 32 wherein it is added to the signal accumulated at the corresponding sampling time of the previous cycle. The accumulated signal is stored in the register ACCR of the accumulator 32 which, therefore, must be capable of storing $Y + Z$ bits, wherein Z represents the maximum number of cycles which may be accumulated to permit the calculator to perform its must precise analysis as it will be disclosed later. The accumulator is of the type known in the art and need not be disclosed in detail.

The content of the register ACCR of accumulator 32 is fed, after each sample, to the memory 34 which contains $n$ register units, one for storing each sample. The memory 34 may be a shift register arranged in such a way as to circulate the information stored therein back to the register ACCR of the accumulator 32 as indicated by the arrow in FIG. 2 of the drawings. Thus, when a predetermined sample of a cycle has been stored into the memory 34, the content of the register unit corresponding to the following sampling time is fed into the register ACCR of the accumulator 32 for adding thereto the following sample of the cycle.

It will therefore be understood that each register unit of the memory 34 must be able to store $U + Z$ digits and that the total bit capacity of memory 34 must be $n \times (U + Z)$. For example, let us assume that the period of the useful signal to be detected is 8 seconds and that, in order to have a good reproduction in time of such signal, the number of samples n taken by the converter 27 is 128. Let us also assume that the number of binary digits used to code each sample of the useful signal is 12 and that 2 more digits are added in each word to take into account the noise accompanying the useful signal. If we add an additional digit for the sign, then the number of digits U will be equal to 15. If we also assume that it is desired to accumulate 64 or $2^6$ cycles in accumulator 32, then the number of digits for each word will be $15 + 6 = 21$. Consequently, the bit capacity of memory 34 will be $21 \times 128$ or 2688 bits. Dynamic registers using MOSFET elements having a capacity of 1024 bits are available and memory 34 could therefore consist of three of such elements.

It will therefore be easily seen that the above disclosed arrangement will permit to add in the register unit of memory 34 which corresponds to each of the n samples of each cycle, the amplitude of the signal corresponding to the same sample in successive cycles. Before transferring the value of the first register unit corresponding to the first sample of each cycle to the accumulator 32, the informations contained in all the register units of the memory 34 are circulated rapidly so as to feed the content of the register units into corresponding register units located in the calculator 36. Thus the calculator must also have the same bit capacity as the memory 34.

The information $B_i$ accumulated in the register units of memory 34 will be:

$$B_i = \sum_{j=1}^{L} V_{AMP_j}(t'_i)$$

wherein
 $i$ is any of the n register units of memory 34,
 $j$ is the cycle just being accumulated,
 L is the total number of cycles accumulated,
 $V_{AMP}$ is the output of the converter 27, and
 $t'_i$ is the sampling time as controlled by clock 40 and is equally divided between 0 and 2T.

Because the output of amplifier 25 is reset to 0 at the beginning of each cycle by intergrator 28, it will be easily understood that the value $V_{AMP_j}(t'_0)$ is always 0 at the time of taking the first sample and that, consequently, the binary value $B_1$ stored in the first register unit of memory 34 is 0. In a general way, $V_{AMP}$ expressed in binary form is:

$$V_{AMP_j}(t') = AF [=V(2jT) + V(t'_i + 2jT)]$$

wherein
 $V(t')$ = voltage detected by the electrodes 23

$$AF = \frac{\text{amplification factor of amplifier 25}}{\text{attenuation factor of attenuator 24}}$$

Because of the noise present with the useful signal, the memory 34 accumulates the following information for each cycle:

$$V_{AMP_j}(t'_i) = AF [V_c(t'_i + 2jT) + V_b(t'_i + 2jT)] - AF [V_c(2jT) + V_b(2jT)]$$

wherein
 $V_c$ is the useful signal and
 $V_b$ is the noise.

However, since the noise occurs at random, the voltages $V_b$ due to noise tend to cancel each other after a number of cycles and becomes negligible as compared to the useful signal. Thus, the information stored into each register unit of the memory 34 after L cycles is:

$$B_i = \sum_{j=1}^{L} V_{AMP_j}(T'_i) = L \times AF [V_c(T'_i + 2jT) - V_c(2jT)]$$

Figure 4:
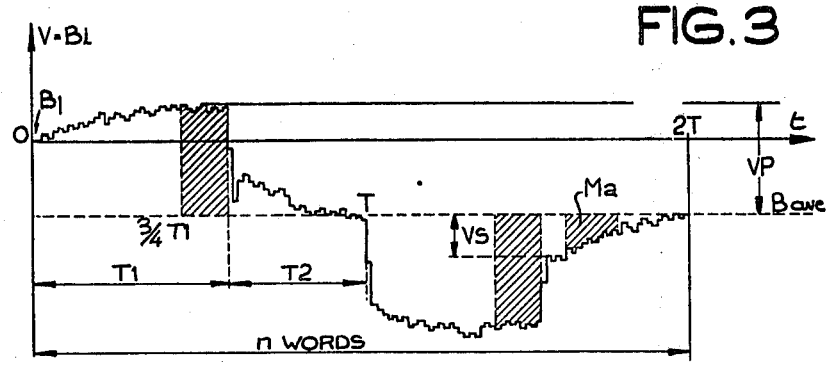
FIG. 4 illustrates the digital signal stored in the memory of the accumulator of FIG. 2 after a predetermined number of cycles when the two clocks are synchronized.

If we assume that the clock 40 started at the same time as the transmitter clock, that is the two clocks were synchronized, then the first sample taken by the converter 27 would have been taken at the very beginning of the cycle of the transmitter. Then the signal stored in memory 34 will have the form illustrated in FIG. 4. When this information is fed to calculator 36, such information may be easily used to calculate parameters $V_p$, $V_s$ and $M_a$ as it will be disclosed later on in the description. It will be noted that the signal of FIG. 4 is similar to the signal of FIG. 1b. Of course, the calculator must take into account the number of cycles L observed and the factor AF because the content $B_i$ of the memory is the sum of the values $V_{AMP_j}(t_i)$ at the output of the converter 27 at each cycle.

It will be understood that the calculator may easily calculate the parameters $V_p$, $V_s$ and $M_a$ because the knowledge of which particular sample $i$ is being stored automatically gives the portions of the cycle being measured. For example, if $T_1 = T_2$, $B_i$ at $i = (n/2)$ indicates that the second portion of the cycle is being scanned. At $i = (n/2)$ the transmitter is OFF whereas at $i = (n/2) + 1$ the transmitter is ON again but transmits negatively. Consequently, the knowledge of the particular sample being stored and of the ratio $(T_1/T_2)$ permits the calculator to evaluate $V_p$, $V_s$ and $M_a$. The above is true provided that $i = 0$ at the moment when the transmitter starts to transmit positively, that is when the clock of the transmitter is in phase with the clock of the receiver. If the clocks are out of phase, the calculator will have to determine the phase difference between the two clocks in order to evaluate the above parameters. This will be discussed later on in the description.

Before proceeding with the method of determining the phase difference between the two clocks, let us consider for a moment the error introduced in the calculation by two clocks which are synchronized but wherein the clock of the receiver is slow or fast with respect to the clock of the transmitter. Therefore, let us assume that during half a cycle $T - T' = dt$ is smaller than $t(i + 1) - t(i)$ wherein i is the sample being evaluated. At the end of the first cycle, there is no problem but after plural cycles the phase difference between the two clocks becomes larger than the time interval between the two sample so that the value of the signal stored into the register units i of the memory 34 may represent the value of the signal between $t(i + 1)$ and $t(i - 1)$ or between $ti$ and $t(i - 2)$ instead of $ti$ and $t(i - 1)$ depending as to whether the clock of the receiver is slow or fast with respect to the clock of the transmitter. There is therefore an error as to the information placed into the register units of memory 34 between $ti$ and $t(i - 1)$ whether with the one appearing at $t(i + 1) - ti$ or with the one appearing at $t(i - 1) - t(i - 2)$. Thus, after a large number of cycles, the information $B_i$ appearing in the register units of the memory 34 will have no meaning. Therefore, it is very important to have two clocks which operate at the same rate. Let us therefore consider the case wherein measurements are taken during an interval $T_i$ of 300 seconds, that is during 50 cycles having a period 2T of six seconds and wherein 128 samples ($n$) are taken during each cycle, and that an error of no more than half a cycle is to be tolerated after the 50 cycles.

The clock of the receiver must thus have a stability:

$$\frac{\Delta T}{T} = \frac{\Delta f}{f} = \frac{2T}{T_i} \times \frac{1}{2} \times \frac{1}{n} = \frac{6}{300} \times \frac{1}{2} \times \frac{1}{128} = 7 \times 10^{-5}$$

for short time intervals, i.e., 5 minutes.

Quarts oscillaters are known which may easily meet the above requirements.

Figure 5A:
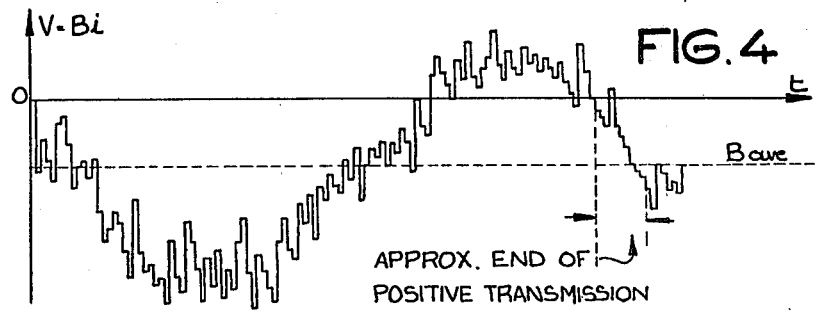
FIGS. 5a and 5b illustrate the same digital signal after one cycle and plural cycles respectively when the phase of the clock of the receiver with respect to the one of the transmitter is unknown.
Figure 5B:
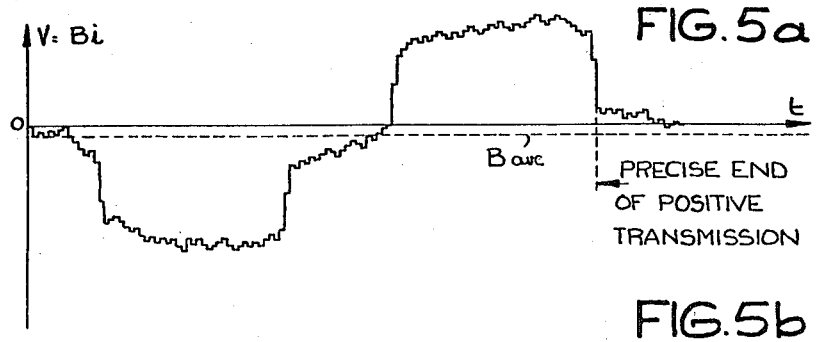
Figure 6A:
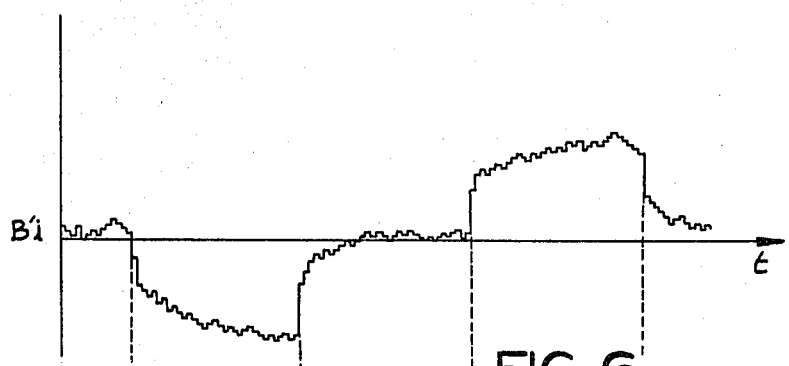
FIGS. 6a to 6e illustrate various operations affected by the calculator of FIG. 2 so as to permit evaluation of the parameters of the detected signal.
Figure 6B:
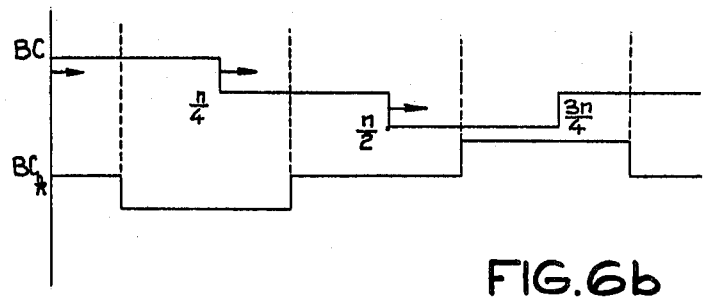
Figure 6C:
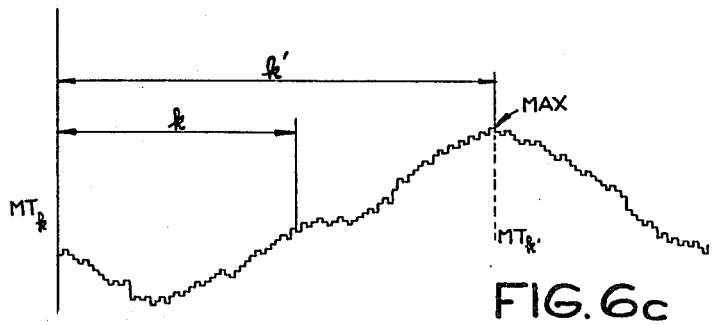
Figure 6D:
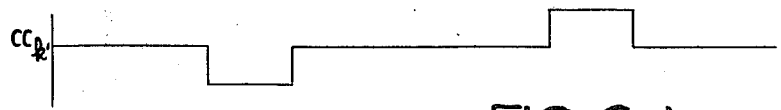

Let us now consider the case which is particularly concerned in the present invention and in which the clock of the receiver does not start at the same time as the one of the transmitter. Therefore, the information $B_i$ stored in the register units of the memory 34 is as illustrated in FIGS. 5a and 5b wherein the first register unit contains information concerning the detected signal at a time of the cycle which may start anywhere in such cycle. The problem is to determine where the sample detected and stored in the first register unit is located in the cycle. In examining FIGS. 5a and 5b, it may be noticed that after the first cycle, such as illustrated in FIG. 5a, it is very difficult to determine precisely where the positive transmission of the transmitter ends. However, after 50 cycles as illustrated in FIG. 5b, the position of the end of positive transmission is precisely known and, after having determined such position, it becomes feasible to evaluate $V_p$, $V_s$, and $M_a$. Therefore, by comparing the shape of the digital signals stored into the memory units of the memory 34 with the shape of the signal transmitted, it is possible to determine the phase shift between the clock of the receiver and the clock of the transmitter. Such phase shift as well as the calculation of the parameters $V_p$, $V_s$ and $M_a$ may be easily done by a calculator of the type known in the art by performing the following operation:

1. The calculator determines the average value Bave of the signal originating from memory 34 and stored in its own memory so as to determine the axis of reference of such signal;

2. the calculator calculates the difference $B'_i = B_i -$ Bave, such difference being illustrated in FIG. 6a;

3. using a correlation pattern BC such as illustrated in FIG. 6b (for the care wherein $T_i = T_2$), and having the value BC = 1 for $1 \leq i \leq n/4$, BC = 0 for $n/4 + 1 \leq i \leq n/2$, BC = −1 for $n/2 + 1 \leq i \leq 3n/4$, and BC = 0 for $3n/4 + 1 \leq i \leq n$, the calculator performs for each integer k the operation:

$$MT_k = \sum_{i=1}^{n} \{B_i' \times BC_{i+k}\}$$

wherein $k$ varies from 0 to $n$ and remembers the value $k'$ of $MT_k$ which gives the maximum value $MT_k$, as shown in FIG. 6c. Such value $k'$ represents the phase shift between the two clocks;

4. the calculator then performs the operation:

$$p = \sum_{i=1}^{n} (B_i \times CC_{(i+k')})$$

using a new correlation pattern CC (FIG. 6d) (for the care wherein $T_f = T_2$) wherein CC = 0 for $0 \leq i \leq n/8$,
CC = +1 for $n/8 + 1 \leq i \leq n/4$,
CC = 0 for $n/4 + 1 \leq i \leq 5n/8$,
CC = −1 for $5n/8 + 1 \leq i \leq 3n/4$, and
CC = 0 for $3n/4 + 1 \leq i \leq n$;

5. assuming that the value $V_p$ is calculated over a period of time $n/8$ for each of the positive and negative value of the signal, then the calculator calculates $V_p$ using the following formula.

$$V_p = \frac{4p}{n \times L \times AF}$$

Figure 6E:
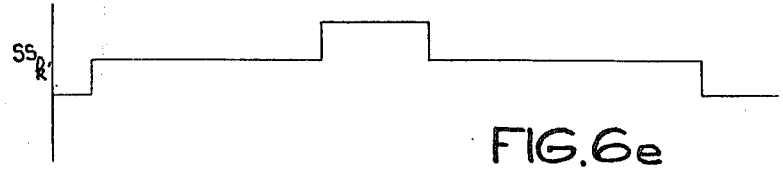

The value $V_p$ will be illustrated by indicator 38 of FIG. 2 of the drawings. Such indicator may include a series of Nixie tubes in a known manner;

6. if it is desired to calculate the chargeability of the soil using the following formula:

$$Ma = \frac{1}{2}\left[\frac{1}{V_p}\int_{T_1+\frac{1}{4}T_2}^{T_1+\frac{3}{4}T_2} V(t)\,dt - \frac{1}{V_p}\int_{T+T_1+\frac{1}{4}T_2}^{T+T_1+\frac{3}{4}T_2} V(t)\,dt\right]$$

a correlation pattern SS such as illustrated in FIG. 6e (for the care wherein $T_1 = T_2$) of the drawings may be used wherein SS = 0 for $1 \leq i \leq 5n/16$,
SS = 1 for $5n/16 + 1 \leq i \leq 7n/16$,
SS = for $7n/16 + 1 \leq i \leq 13n/16$,
SS = −1 for $13n/16 + 1 \leq i \leq 15n/16$, and
SS = for $15n/16 + 1 \leq i \leq n$;

the calculator then performs the following operation:

$$SV = \sum_{i=1}^{n} (B_i \times SS_{(i+k')})$$

7. knowing SV, the calculator then figures out $M_a$ as follows:

$$M_a = \frac{SV}{AF \times L \times 2 V_p};$$

the result of the above calculation may be illustrated by indicator 38 using a series of Nixie tubes.

The above calculation of $V_p$ and $M_a$ was given by way of example. Indeed, $V_s$ may also be calculated following a similar procedure.

The intervals given above for the correlation patterns BC, CC, and SS are given by way of example only; of course, other intervals could be used for the calculation of the parameters $V_p$ and $M_a$.

It will also be understood that the above operations are made by the calculator at the end of each cycle. Of course, as the number of cycles accumulated increases, the values $V_p$ and $M_a$ become more and more stable. Once the values $V_p$ and $M_a$ are stabilized, the operation may be stopped. Since the above operations are to be made in the field, the operator will then move to another station and start taking new measurements.

The correlation pattern BC illustrated in FIG. 6b for measuring the exact phase of the signal detected with respect to the clock of the transmitter does not always give good results. Indeed, the correlation pattern BC is satisfactory only if the signal received $B'_i$ (digital signal is assumed to be continuous instead of being in steps) is slightly deformed by the nature of the rock as illustrated in FIG. 7a, that is if the value $V_s$ is smaller than the value $(V_p/2.)$. It happens very often that the signal decreases very slowly after the end of the positive transmission of the transmitter as illustrated in FIG. 7b so that the voltage $V_{23}$ detected by electrodes 23 does not fall below $V_p/2$ within the time interval separating two consecutive samples taken by the converter 27. In such a case, the phase measured between the two clocks will not be exact as evidenced by the error indicated in FIGS. 7a and 7b.

Referring to FIG. 8, there is illustrated the current and voltage diagrams $I_{12}$ and $V_{23}$ respectively which represent the current transmitted into the group by the electrodes 12 and the voltage detected by the electrodes $V_{23}$. It will be noted that the "break-off" point of the voltage $V_{23}$ occurs automatically at the end of the positive transmission of the transmitted. This "break-off" point occurs before the time when the amplitude of the useful signal received falls below $(V_p/2)$. In accordance with another feature of the invention, it is proposed to use a second correlation pattern PR such as illustrated in FIG. 9 to more precisely determine the phase between the two clocks. In this pattern, PR 32 $-1$ for $i = 1, n/4 + 2, n/2 + 2$ and $3n/4 + 1$ and PR $= -1$ for $i = 2, n/4 + 1, n/2 + 1$ and $3n/4 + 1$. Otherwise PR $= 0$. Here again it is assumed that $T_1 = T_2$. If the pattern PR is correlated with the signal, there is obtained the average rate of absolute decrease of the signal at a given point of the cycle. The correlation MR done by the calculator will be as follows:

$$MR_s = \sum_{i=1}^{n} (B'i \times PR_{(i + s)})$$

wherein $s = k', k' - 1, \ldots k' - v; k'$ being the phase shift obtained with the correlation pattern BC and $v$ a maximum limit which may be set to 20, for example for a cycle divided into 128 scanning times.

Since the decrease of the signal after the end of the positive transmission is, at least at the beginning, exponential, the above correlation will give a maximum just after the "break-off" point and thus will indicate more exactly the end of transmission. Therefore, in the above operation, the calculator will stop when it finds $MR_{(s +1)} < MR_s$ and remembers the value $s'$. Such value $s'$ will represent the true value of the phase shift between the two clocks. The correlation Pattern BC is better when analysing noisy signals but as the signal is averaged out, more precise information will be obtained with a precise correlation PR.

From the above value $s'$, the calculator will determine $V_p$, $V_s$ and $M_a$ by replacing $k'$ by $s'$ in its calculation.

The calculator 36 is of the conventional type and only need to be able to perform the following operations:

1. A + B,
2. A − B,
3. A × B,
4. A/B,
5. A>b do one operation, if A<B do another operation,
6.

$$\sum_{i=1}^{N} A_i \times B_i,$$

wherein $B_i = +1, 0, -1$ depending on the value of $i$, 7. replace A by B, B by C etc., that is transfer information from one memory into another memory.

Although the invention has been disclosed with reference to an induced polarization system of the "time domain type" it is to be understood that the same principle could be used with induced polarization system of the "frequency domain type" wherein the transmitter transmits two or plural frequencies at the same time. The circuit disclosed could be adapted to measure the phase shift of the signal of frequency $F_2$ with respect to the signal of frequency $F_1$. The ratio of the amplitude of the above signals could also be measured as well as their absolute amplitude using suitable using suitable correlation patterns and a different programm.

The apparatus in accordance with the invention could. also be used with suitable correlation patterns and programs to measure the deformation of any periodic signal having a known and stable cycle such as, for example, the harmonic deformations of a sinusoid, or to perform the spectral analysis of a signal, measure a simple or multiple echo, or simply measure the amplitude of a periodic signal (detect its presence).

We claim:

1. An apparatus for evaluating the deformation parameters of a periodic signal pased through a medium by a transmitter controlled by a stable clock and received by a receiver also controlled by a stable clock of the same frequency as the one of the transmitter, said receiver comprising:
   a. a detector for detecting the signal transmitted by the transmitter;
   b. means connected to said detector for resetting to a predetermined value, a voltage of said signal detected by said detector, said resetting means being operative at each integral number of cycles of said signal but at any particular moment of said cycle;
   c. an analog to digital converter connected to said detector for sampling the signal detected by said detector, a predetermined number of times per resetting cycle;
   d. means responsive to said converter for accumulating the digital signals detected at corresponding samples in each cycle;
   e. a calculator responsive to said accumulating means for determining the phase of the digital signals detected as compared to the signal transmitted by the transmitter, said phase defining a phase shift between the receiver and transmitter clocks, and for evaluating the deformation parameters of the received signals from said digital signals while taking into account said phase thereof; and f. means for indicating the results of the evaluation of the calculator.

2. A system as defined in claim 1, wherein said detector includes a filter for filtering components of the detected signal which are outside the useful frequency band of the signal.

3. A system as defined in claim 2, wherein said detected signal has a 60 Hz component, a D.C. component and a high frequency component and wherein said filter includes a first twin T filter circuit for filtering the 60 Hz component, a second filter circuit for filtering the D.C. component and a third low pass filter circuit for filtering the high frequency component of the detected signal.

4. A system as defined in claim 3, wherein said second filter circuit includes a capacitor and means for connecting said capacitor across the output of said first filter circuit for charging said capacitor to a voltage equal to the D.C. component of the detected signal and for subsequently connecting said capacitor in series with the first filter circuit so as to let pass only the variations of the detected signal.

5. A system as defined in claim 4, wherein said detector further comprises an attenuator connected in series with said filter, and further comprising an amplifier connector in series with said attenuator, a peak detector connected to the output of said amplifier for detecting saturation of said amplifier, and a programmer responsive to said peak detector for controlling said attenuator to reduce the amplitude of the detected signal until saturation of the amplifier is obviated.

6. A system as defined in claim 5, wherein said programmer generated a reset signal for resetting the converter, the accumulator, and the clock of the receiver to zero at the beginning of the operation of said receiver.

7. A system as defined in claim 5, wherein said means for connecting said capacitor across said first filter circuit is a relay operated by said programmer.

8. A system as defined in claim 5, wherein said means for resetting the voltage detected by said detector to a predetermined value is an integrator the input of which is connected to the output of the amplifier and the output of which is connected to the input of the amplifier through an adder, said integrator being controlled by said programmer.

9. A system as defined in claim 1, wherein said accumulating means includes a bit accumulator and a memory connected to said bit accumulator for storing the digital signal accumulated by said bit accumulator at the end of each sampling time and for circulating the accumulated digital signal corresponding to the next sampling time back to the digit accumulator for adding thereto the digital signal being sampled.

10. A system as defined in claim 1, wherein said calculator also includes a memory for storing the digital signals accumulated at the end of each cycle.

11. A system as defined in claim 5, wherein the calculator includes a memory for storing the attenuation factor of the attenuator for taking such factor into consideration in the evaluation of the deformation of the detected signal.

12. A system as defined in claim 10, wherein said converter, said accumulator, said progammer and said calculator are controlled by the clock of said receiver.

13. A system as defined in claim 1, wherein correlation patterns permanently stored in the memory of said calculator are used for evaluating the phase of the digital signals and the value of the deformation parameters of the signal.

* * * * *